United States Patent [19]

Goforth

[11] Patent Number: 5,333,524

[45] Date of Patent: Aug. 2, 1994

[54] PRESSURE STABILIZER FOR BARFEED APPARATUS

[75] Inventor: Henry E. Goforth, Hendersonville, N.C.

[73] Assignee: Spego, Inc., Asheville, N.C.

[21] Appl. No.: 937,261

[22] Filed: Aug. 31, 1992

[51] Int. Cl.$^5$ .................. B23B 13/08; B23Q 5/26
[52] U.S. Cl. .................. 82/127; 414/17; 414/18; 137/207; 137/593; 138/26
[58] Field of Search .............. 82/126, 127; 414/17, 414/18; 60/378, 413, 414, 415; 137/207, 593; 138/26, 30, 31; 384/114, 398

[56] References Cited

U.S. PATENT DOCUMENTS

| 1,927,752 | 9/1933 | Pardee | 137/207 |
| 3,146,796 | 9/1964 | Everett | 138/26 |
| 3,169,551 | 2/1965 | Lewis | 138/26 |
| 4,352,615 | 10/1982 | Neukomm | 82/126 |

Primary Examiner—William E. Terrell
Attorney, Agent, or Firm—James H. Laughlin, Jr.

[57] ABSTRACT

A pressure stabilizing apparatus is given which is capable of storing and supplying the volume of hydraulic fluid needed for rapid advances as well as accepting displaced hydraulic fluid required for rapid retractions in a barfeed apparatus. This pressure stabilizing apparatus or surge-accumulator device demonstrates the advantage of eliminating excessive force, which could damage the headstock, cause increased vibration and noise, and also prevents loss of contact with the bar end, all of which limit the speed of the spindle, and reduce productivity.

2 Claims, 2 Drawing Sheets

PRESSURE STABILIZER FOR BARFEED APPARATUS

BACKGROUND OF THE INVENTION

1. Field of Invention

This invention relates to a feed apparatus for machine tools.

This invention further relates to feed apparatus for machine tools and more particularly to hydraulic barfeed apparatus for machine tools which have a moving headstock that moves the barstock back into the barfeed apparatus rapidly and advance it forward rapidly.

This invention specifically relates to a simple, but effective design that maintains a very stable pressure in the hydraulic system of barfeed apparatus for moving headstock machines.

2. Related Art

Barfeed devices for machine tools with a moving headstock have been commercially available for many years. In general they have been limited to gravity feed, however other methods including hydraulics and pneumatics have also been used.

The gravity type advances the bar toward the spindle with a chain or cable pulling a pusher of some type inside a guide tube, the cable or chain is pulled by a weight. Gravity feed designs are the least effected by rapid movement of a moving headstock machine but they are difficult to adjust and operate. While these designs have specific benefits, they are generally considered to be very limited by those skilled in the art, and generally require lower spindle speeds than other designs.

The hydraulic cylinder designs offer greater control and ease of adjustment but do not work well with machine tools with moving headstock. The pressure is adjusted manually and rapid travel of stock backwards into the feeder increase the pressure faster than it can be unloaded. The resulting increase in pressure increases vibration and noise, limiting the speed of the spindle, reducing productivity. In some cases the sudden increase in pressure causes lines to break and seals to leak. When the stock rapids forward the end of the bar can leave the support and guide of the pusher and the unguided bar end can be very dangerous. In designs that incorporate hydrodynamic support air can be trapped in the pusher resulting in insufficient fluid in the guide tubes, appreciable lessening the hydrodynamic support.

SUMMARY OF THE INVENTION

The invention provides for a solution to these described problems of the prior art and other problems with a simple, but effective design that maintains a more stable pressure.

It is an object and advantage of this invention to maintain constant pressure for feeding barstock to machine tools that have a moving headstock, prevent excessive force on the headstock, on the barstock, and in the hydraulic system of the barfeed.

It is a further object and advantage of this invention to provide an apparatus which can be readily added to existing systems.

Other objects and advantages can be seen from a full understanding of the invention.

BRIEF DESCRIPTION OF THE DRAWINGS

A preferred embodiment of the invention will be described further with references to the accompanying drawings in which.

DETAILED DESCRIPTION OF THE INVENTION

Figure 1:
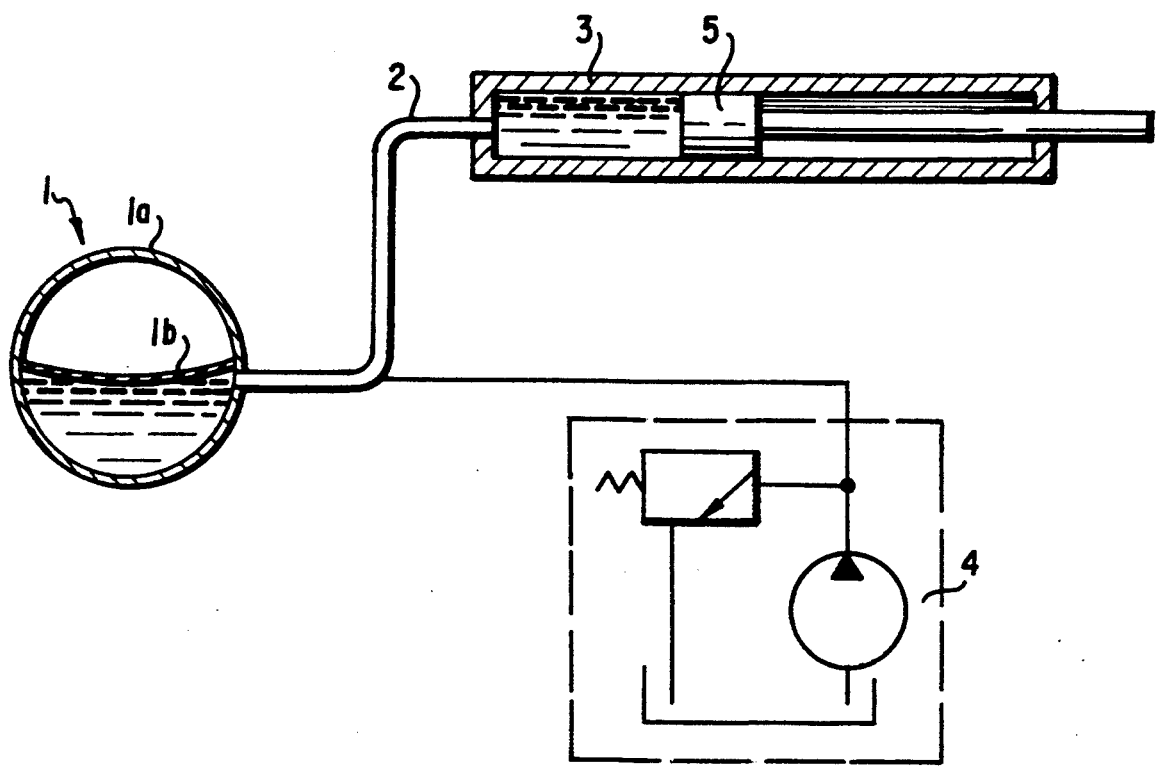
FIG. 1 is a schematic general view of an embodiment of this invention.

The pressure stabilizing invention for hydraulic bar feeder apparatus is detailed in FIG. 1. It is comprised of a surge-accumulator 1, with a pre-charge valve 1a, and a bladder 1b. A properly sized line 2 must connect the surge-accumulator 1 and the cylinder 3. The hydraulic system 4 feeds into the connecting line 2. Sudden and rapid changes of the volume caused by sudden and rapid movement of the piston pusher 5 are stabilized in the surge-accumulator 1. The surge-accumulator 1 is sized according to the maximum volume displacement of the cylinder 3 caused by the moving headstock. Line 2 is sized according to the speed at which the moving headstock displaces the volume. The operating pressure of the bar feeders hydraulic system 4 determines the pre-charge. In order to understand fully the pressure stabilizing invention it would be well to consider FIGS. 2 and 3 which show how the invention works with both forward and backwards rapid movement of the headstock.

Figure 2:
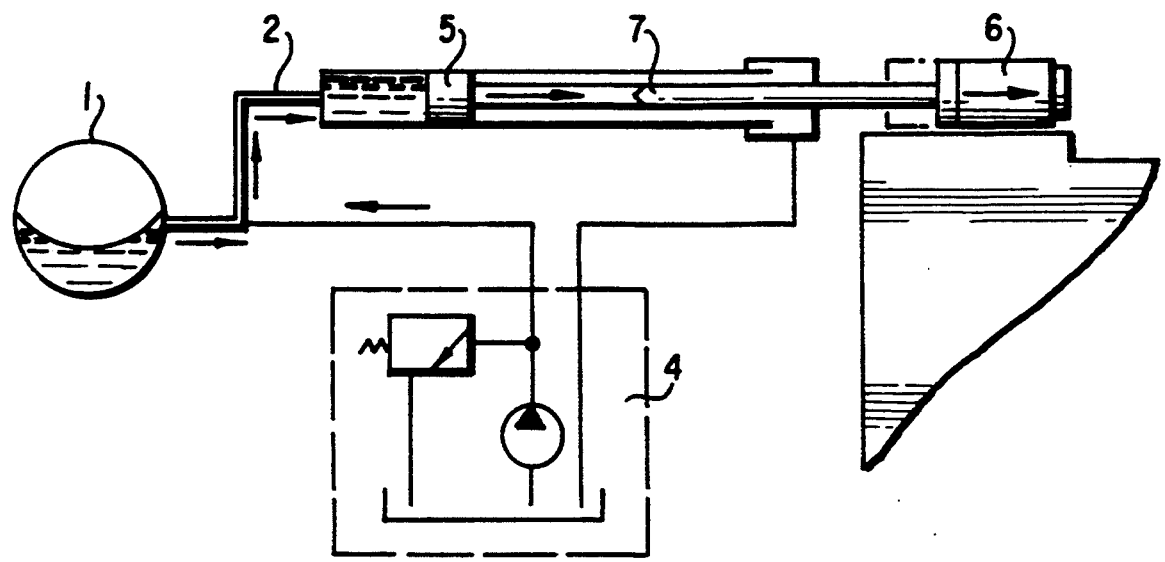
FIG. 2 is a diagram illustrating a forward cycle of a feed apparatus equipped in accordance with the invention.

With a rapid movement forward, of the headstock 6, as shown in FIG. 2, barstock 7 is pulled forward rapidly. The piston pusher 5 is able to maintain its push on the barstock 7 without any significant change in force because the needed volume of hydraulic fluid is supplied from the surge-accumulator 1 through the connector 2. Maintaining the contact of the piston pusher 5 with the barstock 7 is critical for safe operation, the end of the barstock can be extremely dangerous, if not guided and controlled by the piston pusher 5. If the headstock 6 does not rapid back to its original position immediately the surge-accumulator is refilled by the bar feeders hydraulic system 4.

Figure 3:
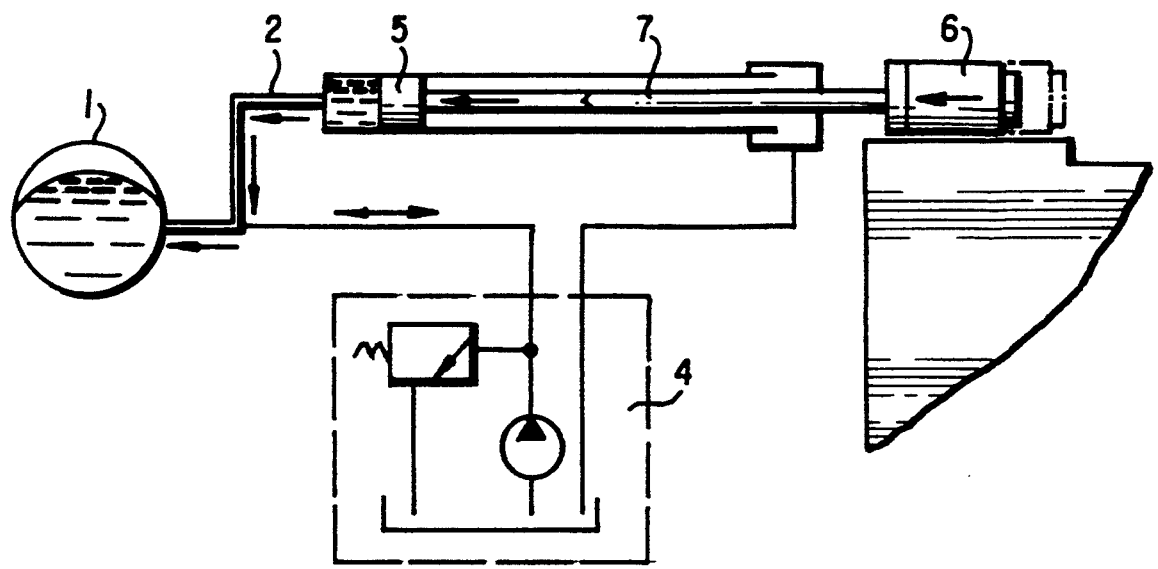
FIG. 3 is a diagram, similarly to FIG. 2 illustrating a backward cycle of the feed apparatus equipped in accordance with the invention.

A rapid movement backwards, of the headstock 6, as shown in FIG. 3, rapidly pushes the barstock 7 back, which pushes the piston pusher 5 back, displacing the hydraulic fluid through the connecting line 2 into the surge-accumulator 1 eliminating any significant change in the force of piston pusher 5 against the barstock 7 and the headstock 6. If the headstock 6 does not rapid forward to its original position immediately the volume of hydraulic fluid in the surge-accumulator 1 is reduced through the bar feeders hydraulic system 4.

Figure 4:
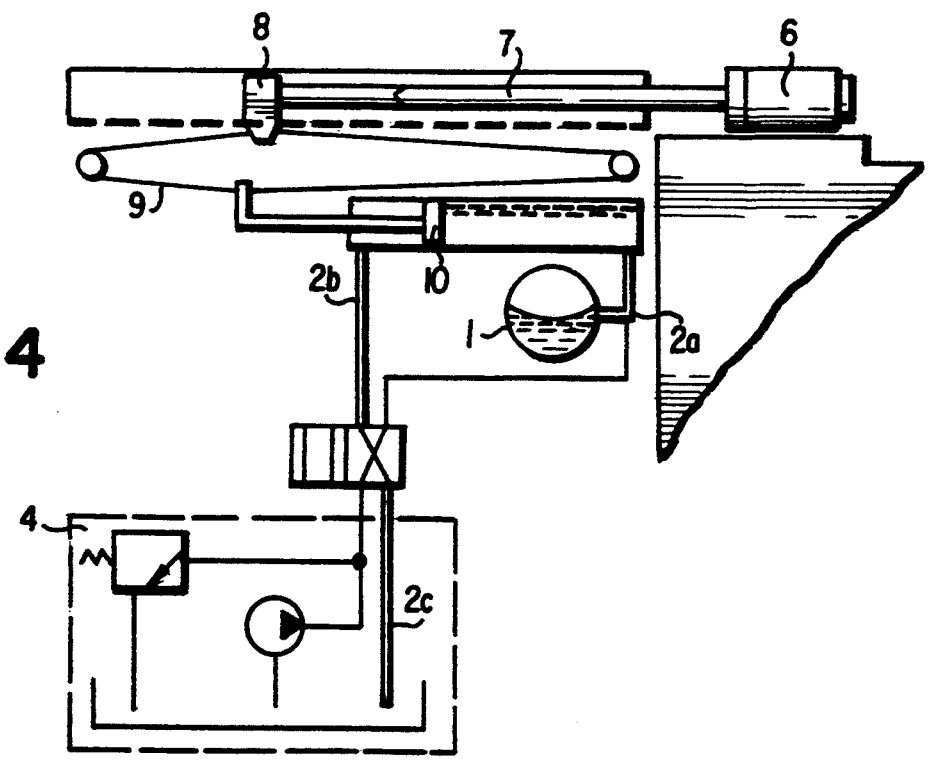
FIG. 4 is a schematic view of a feed apparatus, with a double acting cylinder, equipped in accordance with the invention.

A preferred method for a double acting cylinder can be seen in FIG. 4. A rapid movement backwards, of the headstock 6 rapidly pushes the barstock 7 back, which forces back the pusher 8 and attached cable 9. The cable 9 is attached to the piston 10 and pulls it backwards, displacing the hydraulic fluid behind the piston 10 through the connecting line 2 into the surge-accumulator 1 eliminating any significant change in the force of piston 10 against the cable 9, pusher 8, barstock 7 or headstock 6. With a rapid forward of the headstock 6 the pusher 8 is able to maintain its contact with the barstock 7 without any significant change in force because the needed volume of hydraulic fluid is supplied from the surge-accumulator 1 to the piston 10 keeping the pusher 8 in contact with the barstock 7. Connecting lines, 2a and 2b, and return line 2c must be sized properly for a double acting cylinder. The level of hydraulic fluid in the surge-accumulator 1 is maintained by the immediate reverse action of the headstock 6 or through the bar feeders hydraulic system 4. The four way valve 11 is used for retraction to load a new bar.

While specific hydraulic fluids for these applications are well known in the art, such fluids share, generally, the characteristic of being a non-compressible fluid. Of course such fluids are not easily combustible and maintain their operating characteristics over a wide range of temperatures and conditions.

Compressible fluids such as air and other gases which are not generally soluble in the non-compressible fluids can be selected. Of course, where the system is completely closed, the solubility of the compressible fluid is not significant.

In yet another embodiment of this invention, the surge-accumulator may be advantageously mounted above or overhead the headstock eliminating any need for a pre-charge valve or bladder. This is easily accomplished by raising surge-accumulator 1 in FIGS. 2 and 3 to any vertical position above or overhead piston pusher 5 and opening or eliminating pre-charge valve 1(a) so that air at atmospheric pressure may flow into or out of the surge-accumulator 1 above the hydraulic or non-compressible fluid. As the surge accumulator empties itself entirely during the reverse cycle, air replaces the discharged hydraulic fluid at atmospheric pressure.

The preceding detailed descriptions illustrates the unique and novel pressure stabilizer for barfeed apparatus. While the preferred embodiment of the present invention has been described in detail, it its apparent that modifications and adaptations of this embodiment will occur to those skilled in the art. However, it is to be expressly understood that such modifications and adaptations are within the spirit and scope of the present invention as set fourth in the following claims.

What is claimed is:

1. In a machine tool feed apparatus having means including a non-compressible fluid circuit for feeding bar stock to a machine tool having a headstock which moves in opposing directions, the improvement comprising:

a fluid containing chamber in communication with said fluid circuit containing a volume of non-compressible fluid flowing in communication with said fluid circuit, the chamber further containing a compressible fluid acting on said non-compressible fluid to supply said non-compressible fluid to said fluid circuit during motion of said headstock in one said direction and for storing non-compressible fluid from said fluid circuit during motion of said headstock in the other said direction.

2. The apparatus of claim 1 wherein said fluid containing chamber is divided by a bladder separating the compressible fluid from the non-compressible fluid.

* * * * *